US007725443B2

(12) United States Patent
Litwin et al.

(10) Patent No.: US 7,725,443 B2
(45) Date of Patent: May 25, 2010

(54) DISCUSSION ASSOCIATION FOR E-MAIL

(75) Inventors: Louis Robert Litwin, Plainsboro, NJ (US); Purvin Bibhas Pandit, Somerset, NJ (US)

(73) Assignee: Thomson Licensing, Boulogne-Billancourt (FR)

( * ) Notice: Subject to any disclaimer, the term of this patent is extended or adjusted under 35 U.S.C. 154(b) by 62 days.

(21) Appl. No.: 10/590,330

(22) PCT Filed: Feb. 26, 2004

(86) PCT No.: PCT/US2004/005682

§ 371 (c)(1),
(2), (4) Date: Aug. 23, 2006

(87) PCT Pub. No.: WO2005/093595

PCT Pub. Date: Oct. 6, 2005

(65) Prior Publication Data

US 2007/0198639 A1      Aug. 23, 2007

(51) Int. Cl.
G06F 17/30      (2006.01)
(52) U.S. Cl. .................. 707/694; 707/917; 707/922; 709/238
(58) Field of Classification Search .................. 707/1, 707/7, 100, 101, 102, 104.1, 200, 201
See application file for complete search history.

(56) References Cited

U.S. PATENT DOCUMENTS

| 5,999,179 | A * | 12/1999 | Kekic et al. ................. 715/734 |
| 6,341,306 | B1 * | 1/2002 | Rosenschein et al. ....... 709/217 |
| 6,592,627 | B1 * | 7/2003 | Agrawal et al. ............. 715/513 |
| 6,615,241 | B1 | 9/2003 | Miller et al. |

OTHER PUBLICATIONS

"Shared Folders: Your Online Conference Room" by Doug Anderson, Cool Solutions Magazine, 1997, Novell Inc.*
Microsoft Outlook 2003 Advanced Information Management. PC Today, by Jennifer Farwell Feb. 2006, vol. 4, issue 2 pp. 30-31 pulled from http://www.pctoday.com/editorial/article.asp?article=articles%2F2006%2Ft0402%2F11t02%2F11t02.asp.*
Search Report Dated Sep. 30, 2004.

\* cited by examiner

Primary Examiner—Etienne P LeRoux
Assistant Examiner—Bruce A Witzenburg
(74) Attorney, Agent, or Firm—Robert D. Shedd; Robert B. Levy; Jeffrey D. Hale

(57) ABSTRACT

A system and method for allowing users to associate various e-mails within at least one of the user's mailboxes under a common discussion topic or "thread" for organizational purposes. This user-controlled organization may be carried out regardless if the e-mails which are desired to be associated are from different senders and/or have different subject headings. An e-mail message may be associated to/designated under a user-defined discussion topic or associated to another e-mail. At the user's discretion, information about the e-mail's associated discussion topic and/or associated e-mails may be stored and kept locally with the user's mailbox, or alternatively, information about the e-mail's associations may be transmitted when that e-mail is sent to a recipient user.

15 Claims, 4 Drawing Sheets

DISCUSSION ASSOCIATION FOR E-MAIL

This application claims the benefit, under 35 U.S.C. §365 of International Application PCT/US2004/005682, filed Feb. 26, 2004, which was published in accordance with PCT Article 21(2) on Oct. 6, 2005 in English.

TECHNICAL FIELD OF THE INVENTION

The present invention generally relates to an e-mail organization system and, more particularly, to a system and method of allowing users to associate e-mails from different sources and/or having different subject headings within or under a common discussion topic for organizational purposes.

BACKGROUND OF THE INVENTION

Nowadays, it is commonplace for a computer e-mail user to receive several dozen or more e-mails in any given day. As a result, a user's "inbox" can quickly fill up with numerous e-mails and become difficult to manage.

One attempt at a solution is to have the user organize e-mails into folders. This may work well when the user is receiving a large number of e-mails over a long period of time which are all associated. For example, a user might put all e-mails associated with a given project in the same folder. However, this method presents some drawbacks. One problem is that it is cumbersome to create new folders for each discussion topic, especially when the topic is something that is likely only relevant for a few days. Another problem is that a user can only view e-mails in a single given folder; e-mail programs do not allow a user to view the contents of all folders simultaneously.

Accordingly, a need exists for a system and method for efficiently and effectively associating e-mails under a common discussion topic for organizational purposes in a convenient manner that overcomes the limitations and problems of the prior art.

SUMMARY OF THE INVENTION

The present invention permits users to associate an e-mail message to a user-created discussion topic and/or to another e-mail for organizational purposes, regardless of whether the e-mails desired to be associated have different subject headings and/or were received from different senders. The associations (associated e-mails or associated e-mail-to-topic) can be created and displayed within any of the user's mailboxes. In its heretofore disclosed system and method, the present invention addresses the prior art problems described above by obviating the need to create new folders for each discussion topic and having the ability to allow a user to view the contents of all folders simultaneously.

The present invention allows the user to associate received e-mails to a user-defined discussion topic or, e.g., to any received e-mail. The user can, for example, thus associate e-mails which do not have to have the same sender or subject heading as the "designated" e-mail which they are being associated to.

In one aspect, the present invention provides a method for organizing e-mail messages comprising the steps of indicating at least one first e-mail message in a user mailbox, associating the at least one first e-mail with a second e-mail by enabling an association option; and forming an associated group in the user mailbox comprising at least two or more associated e-mails.

In another aspect, the present invention provides a method for organizing e-mail messages comprising the steps of creating a user-defined discussion topic heading, said discussion topic heading appearing as an entry in at least one of the user's mailboxes, and associating at least one e-mail message to the discussion topic to form an associated e-mail-to-topic group.

In yet another aspect, the present invention provides an e-mail system comprising e-mail software for providing e-mail capabilities to a user and an associate feature for providing e-mail organization capabilities to the user by organizing e-mail messages to form at least one of an associated group of e-mails or an associated e-mail-to-topic group in at least one of the user's mailboxes.

These, and other aspects, features and advantages of the present invention will be described or become apparent from the following detailed description of the preferred embodiments, which is to be read in connection with the accompanying drawings.

BRIEF DESCRIPTION OF THE DRAWINGS

In the drawings, wherein like reference numerals denote similar elements throughout the views.

It should be understood that the drawings are for purposes of illustrating the concepts of the invention and are not necessarily the only possible configuration for illustrating the invention.

DETAILED DESCRIPTION OF THE INVENTION

The present invention provides a system and method for allowing users to associate e-mails under a common discussion topic or "thread" for organizational purposes. Such user-controlled organization is possible regardless of whether the e-mails which are desired to be associated are from different senders and/or have different subject headings. The present invention preferably would reside in the software of a user's e-mail program.

In one embodiment, all information about the e-mail's associated. discussion is stored and kept locally with the user's mailbox. Reply e-mails will not include any information about the associations to permit compatibility, for example, with e-mail programs of recipients that do not support the present invention.

In an alternative embodiment, information about the e-mail's associations would be transmitted along with the reply e-mail so that recipient users with, for example, e-mail programs that support the present invention would be able to see which discussion thread the received e-mail is associated with.

The present invention further provides wherein a received e-mail is automatically processed to ascertain whether or not it is associated with another e-mail(s) and/or has a discussion topic heading (e.g., already has an existing discussion thread). Depending on what is ascertained, appropriate action is automatically taken.

It should be understood that the elements shown in the FIGS. may be implemented in various forms of hardware, software or combinations thereof. Preferably, these elements are implemented in software on one or more appropriately programmed general-purpose devices, which may include a processor, memory and input/output interfaces.

Figure 1:
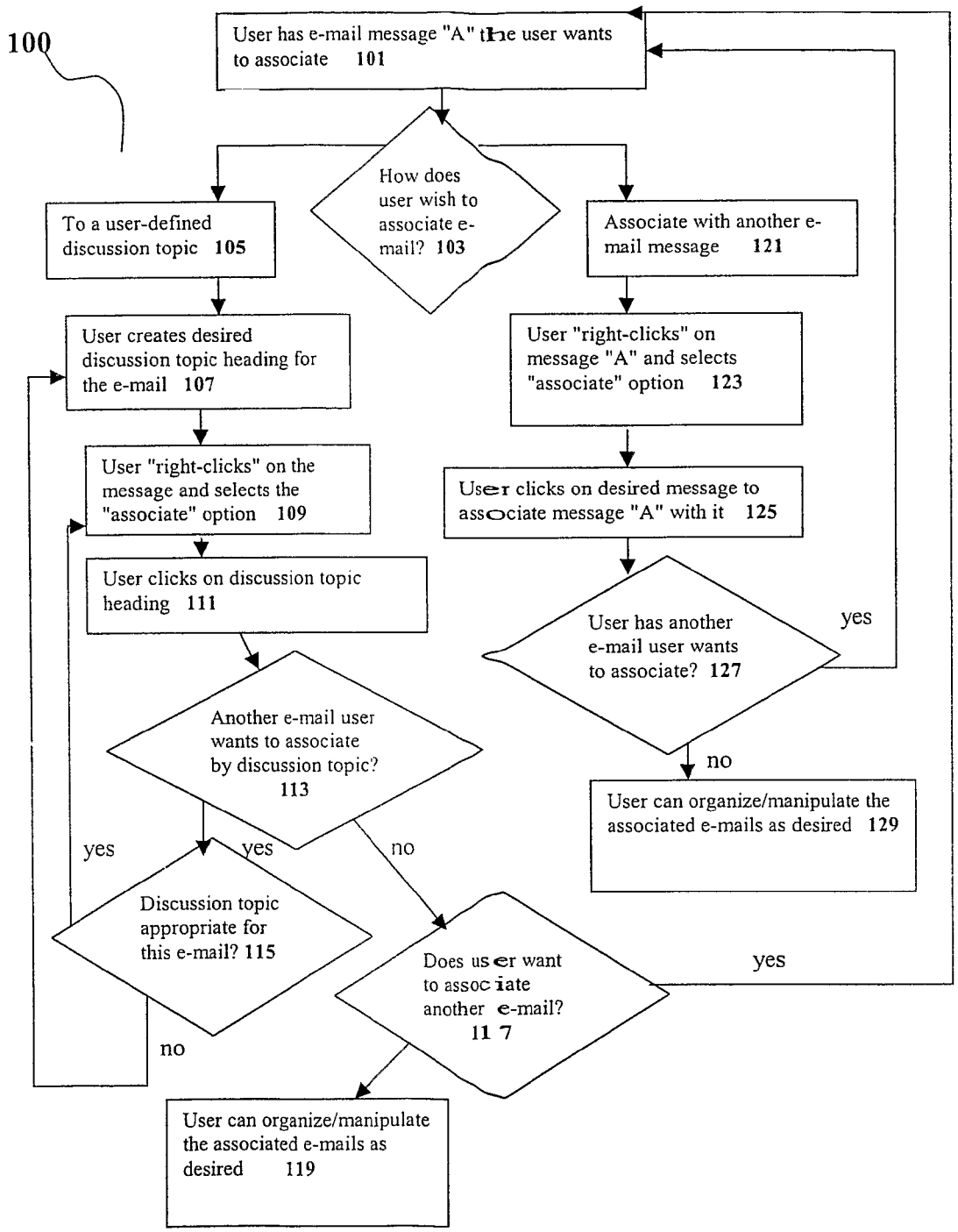
FIG. 1 illustrates an exemplary flowchart of a method of associating e-mails according to an aspect of the present invention.

Referring now to the Figures, FIG. 1 depicts an exemplary flowchart 100 of a method of associating e-mails according to an aspect of the present invention. In step 101, a user is provided with an e-mail message "A" that the user would like to organize (associate). The e-mail message "A" is preferably provided via any conventional e-mail software for providing e-mail capabilities to the user. It is to be noted that the e-mail message "A" may, for example, have another e-mail(s) already associated to it. In decision box 103, the user decides how to associate the message "A." If the user decides to associate message "A" to a user-defined topic (step 105), the user creates a desired discussion topic heading for message "A" (step 107). Preferably, the discussion topic heading may, for example, be designated to appear as an additional field in a mailbox entry for message "A" in a user's mailbox, such that the discussion topic heading field will preferably be in addition to other mailbox entry fields such as subject heading, date, recipient, etc.

In step 109, the user "right-clicks" on message "A" (or otherwise causes a window having, for example, a list of options to appear on the message). Upon causing the options list to appear, the user selects an "Associate" option. The user then clicks on the discussion topic heading (step 111) which automatically associates message "A" to the discussion topic heading to form an associated "e-mail-to-topic" group.

In decision box 113, the user ascertains if there is another e-mail message which the user want to associate by discussion topic. If yes, the user goes on to decision box 115. If no, the user proceeds to decision box 117. In decision box 115, the user decides if the previously created discussion topic is appropriate for this message. If yes, the user returns to step 109. If no, the user returns to step 107 to create a new discussion topic heading.

In decision box 117, the user decides whether the additional e-mail is to be associated to another e-mail (rather than to the discussion topic). If yes, the user returns to step 121. If no, the user proceeds to step 119, where the user can organize/ group/manipulate the associated e-mails as desired (explained further with respect to FIG. 2). Such manipulation includes, e.g., wherein any e-mail operation (such as "move," "cut," "paste", "delete", "forward," etc.) can be performed on an entire group of associated e-mails/discussion thread simultaneously.

It is to be noted that according to an aspect of the present invention, an "options list" is provided with respect to each e-mail message. The options list can be caused to appear with respect to an e-mail message by, for example, right-clicking on a mouse while the e-mail message is open. The options list includes, e.g., the "associate" option, which, when selected, allows the selected e-mail to be automatically associated with at least one of a subsequently selected e-mail message or a user-defined discussion topic heading.

In decision box 103, if the user decides to associate the message "A" to another e-mail message (step 121), the user "right-clicks" on message "A" (or otherwise causes the options list to appear with respect to message "A") and selects the "associate" option (step 123). It is to be noted that the other e-mail message in step 121 may, for example, have other e-mail(s) already associated to it. The user then clicks on the desired message (or otherwise selects the desired message), which automatically associates the desired message with message "A" (step 125). Next, in decision box 127, the user ascertains whether there is another e-mail the user wants to associate. If yes, the user returns to step 101. If no, the user proceeds to step 129, where the user can organize/group/ manipulate the associated e-mails as desired (explained further with respect to FIG. 2). Such manipulation includes wherein any e-mail operation (such as "move," "cut," "paste", "delete", "forward," etc.) can be performed on an entire group of associated e-mails/discussion thread simultaneously.

Advantageously, according to an aspect of the present invention, it is to be noted that e-mails may be associated to each other and/or to a user-defined discussion topic within any one of the user's mailboxes and such association may be carried out regardless of whether the e-mails have different subject headings and/or have been received by and/or sent to different e-mail addresses/users.

It is further to be noted that this process can be used to associate any single e-mail (or a group of two or more already associated e-mails) to any other e-mail and/or discussion topic in a user's mailbox. For example, the user may associate an e-mail to an e-mail which already has other associations. In addition, it is to be noted that the present invention may be used to associate a group of associated e-mails to another group of associated e-mails. It is further to be noted that the terms "user mailbox" or "user's mailbox" are to be interpreted to include any type of e-mail mailbox, e.g., an inbox, outbox, box for deleted e-mail, etc.

Figure 2:
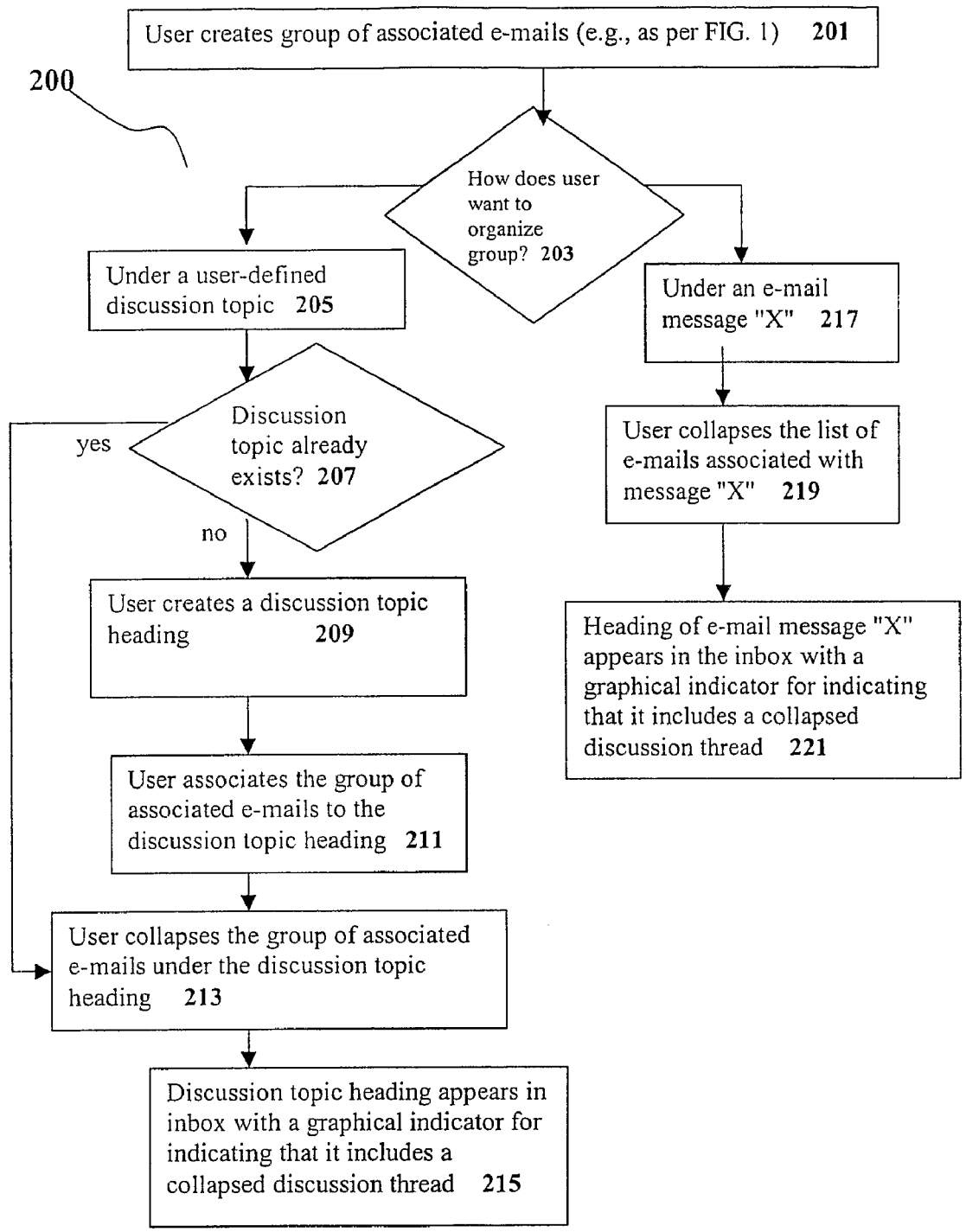
FIG. 2 illustrates an exemplary flowchart of a method for allowing a user to designate the group of associated e-mails created in FIG. 1 under a user-defined discussion topic or under an e-mail message according to an aspect of the present invention.

FIG. 2 is an exemplary flowchart 200 of a method for allowing a user to designate a group of associated e-mails (e.g., as created in FIG. 1) under either a user-defined discussion topic or under an e-mail. Having created a group of associated e-mails as per the method of, e.g., FIG. 1 (steps 215 and 221), the user then decides on how to organize the group (step 203). If the user wishes to organize the group under a user-defined discussion topic (step 205), the user first ascertains whether a discussion topic heading already exists (step 207), e.g., if the discussion topic heading was created previously as per step 107.

If no, the user creates a discussion topic heading (step 209) and associates the group under the discussion heading (step 211) to create an expanded group of associated e-mails. Preferably, a graphical indicator is provided to indicate that the list is expanded. The user can collapse the group of associated e-mails under the discussion topic heading (step 213) such that only the discussion topic heading appears in the user's inbox with, e.g., a graphical indicator for indicating that it includes a collapsed discussion thread.

If yes, the user proceeds directly to step 213 from step 207.

If the user decides to designate the group under an e-mail message, e.g., message "X" (step 217), the user collapses the expanded list of e-mails associated with the message "X" (step 219). Only the heading of message "X" will thus appear in the user's inbox with, e.g., a graphical indicator for indicating that it includes a collapsed discussion thread (step 221). The concept of "collapsing" and details regarding the graphical indicators are explained in further detail below.

To illustrate, suppose a user gets an e-mail from a patent attorney about an invention disclosure. The user then e-mails several of his co-inventors to ask for their feedback. The co-inventors send their e-mail replies back to the user. This results in the user now receiving several e-mails in his "inbox" that are from different senders (i.e., from each co-inventor) and thus may have different headings, although they are all associated with the same discussion (i.e., the discussion about the invention disclosure). Since this discussion might only last for a day or so, it would be cumbersome for the user to create an e-mail folder just for this single discussion. In such a situation, the system and method of the present invention would be advantageous in allowing the user to be able to group the desired e-mails together quickly and efficiently for organizational purposes.

In the above described situation, the present invention would allow the user to, e.g., "right-click" (or otherwise cause the options lists to appear with respect to that message) on each of the received e-mail replies from each of the co-inventors and select an "associate" option from the options list. The user then chooses another e-mail to which the user wants the selected e-mails to be associated to. For example, here the user could select the original e-mail from the patent attorney; as a result, all of the selected co-inventors' e-mails would be associated with that original e-mail.

According to an aspect of the present invention, the user could then organize/handle all the associated e-mails as a group. For example, the user could collapse the list of e-mails into a single entry in his inbox that just shows the original patent attorney's e-mail. Alternatively, the user could create a new heading and label the entire group of associated e-mails with the heading (e.g., "Disclosure Discussion") and only that heading would appear in the user's inbox.

In yet another aspect of the present invention, a graphical indicator (e.g., a symbol) is provided as discussed above in FIG. 2 which can be used in the user's inbox to indicate that an e-mail entry in the inbox includes a collapsed or expanded discussion thread (i.e., additional e-mails which are associated with that particular e-mail). For example, a collapsed thread may appear as follows:

| + | John Doe "invention disclosure" |
|---|---| wherein the "+" is an exemplary graphical indicator or symbol indicating that the thread is currently collapsed and can be expanded. If the user desires to see the additional e-mails which are associated to this e-mail, the user may click on the graphical indicator, which results in an expanded thread being shown. In addition, a different graphical indicator (e.g., "−") may be used to indicate that the expanded version has been selected and is currently being shown. For example, an exemplary expanded thread for the above collapsed thread may appear as follows:

| − | John Doe | "invention disclosure" |
|---|---|---|
| | [ Bob Adams | "comments on invention" |
| | [ John Doe | "additional information" |
| | [ Sue Smith | "my comments" |

It is to be noted that each of the associated e-mails (e.g., designated above with a "[" preceding each) can also have its own associated e-mails. To illustrate:

| − | John Doe | "invention disclosure" |
|---|---|---|
| | [ + Bob Adams | "comments on invention" |
| | [ John Doe | "additional information" |
| | [ Sue Smith | "my comments" |

Clicking on the "Bob Adams" e-mail (preceded with the graphical indicator "+") would expand it to show its associated e-mails, for example:

| − | John Doe | "invention disclosure" |
|---|---|---|
| | [ − Bob Adams | "comments on invention" |
| | [ [ | Jane Clark "disclosure comments" |
| | [ John Doe | "additional information" |
| | [ Sue Smith | "my comments" |

If the user desires to collapse the expanded thread (e.g., revert back to the collapsed thread), the user may click on the "−" symbol in front of the expanded e-mail, which would allow the user to collapse the expanded list for easy and streamlined mailbox organization.

According to other aspects of the invention, any e-mail operation (such as "move," "cut," "paste", "delete", "forward," etc.) can be performed on individual e-mails or alternatively, on an entire group of associated e-mails/discussion thread simultaneously.

In a preferred embodiment, the present invention would reside in the software of a user's e-mail program and any additional data indicating user-defined associations would be stored locally on the user's machine (since the discussion threads are user-defined). Thus, a single e-mail sent to multiple users (wherein these "recipient users" have e-mail programs which support the present invention), may be associated to different discussion threads by each of those recipient users, depending on the individual desires of each recipient user.

Figure 3:
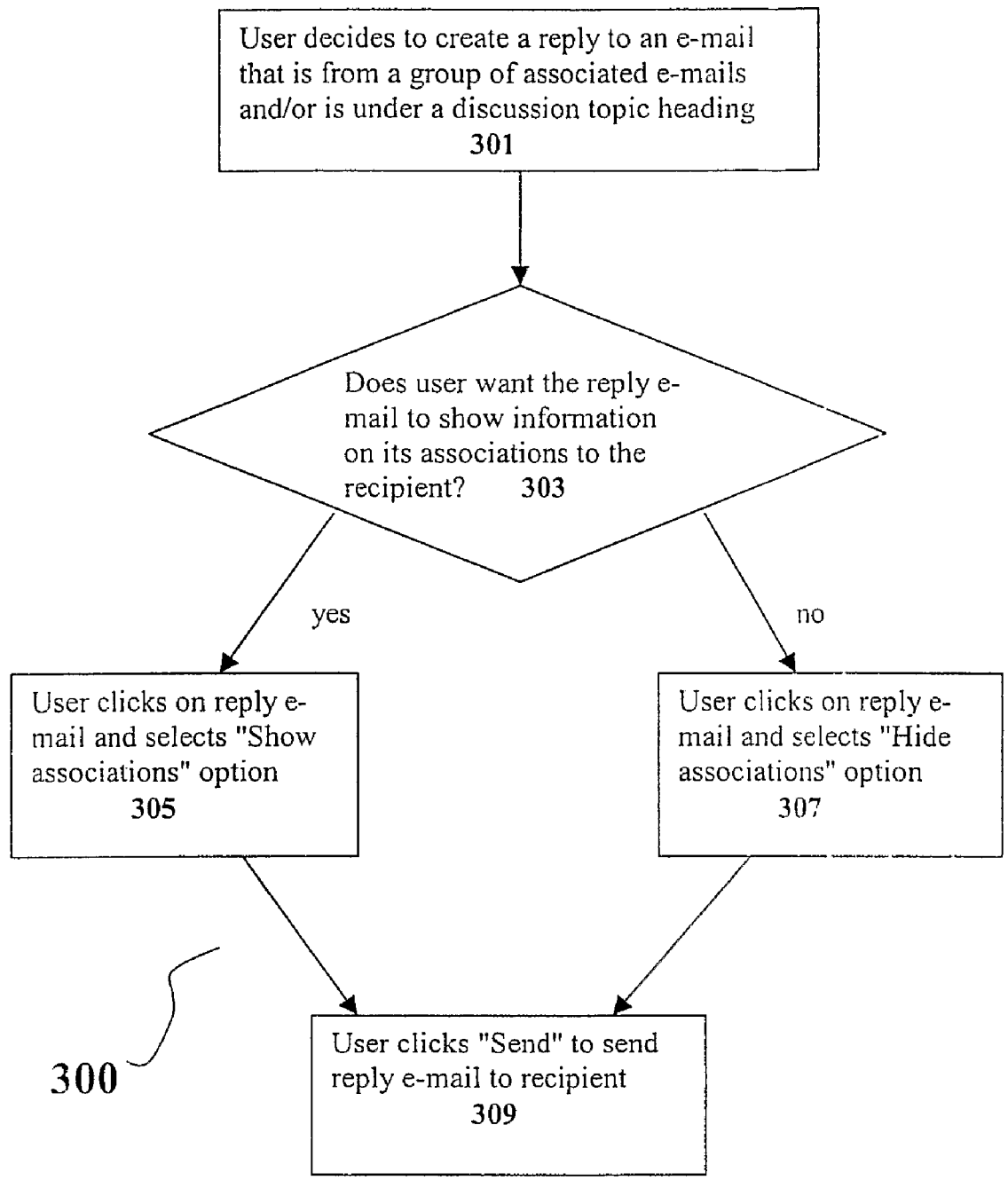
FIG. 3 depicts an exemplary flowchart of a method for showing or hiding an e-mail's associations according to an aspect of the present invention.

According to another aspect, a user has the ability to selectively switch "on" or "off" the feature permitting e.g., a sent e-mail to show information regarding what discussion thread it belongs to. FIG. 3 depicts an exemplary flowchart 300 of a method for showing or hiding an e-mail's associations according to an aspect of the present invention. It is to be noted that the options list according to the present invention also preferably includes, e.g., "Show associations" and "Hide associations" options. This gives the user the ability to control whether each individual e-mail which, e.g., is to be sent by the user will show or hide its associations (e.g., associated e-mails and/or associated discussion topic) to/from the recipient.

For example, when a user decides to create a reply to an e-mail that is from a group of associated e-mails and/or is under a discussion topic heading (step 301), the user decides, prior to sending the reply, whether or not the user wants the e-mail reply to show information regarding its associated e-mail(s) and/or discussion topic heading (step 303). If yes, the user "right-clicks" on the reply e-mail (or otherwise causes the options list to appear on the e-mail reply), and selects the "Show associations" option (Step 305). The user then sends the reply to the recipient (step 309). If no, the user "right-clicks" on the reply e-mail, selects the "Hide associations" option from the options list (step 307) and then sends the reply to the recipient (step 309).

Advantageously, it is to be noted that if the user designates that a reply to e-mails in discussion threads not carry (hide) any information regarding what thread it belonged to, this would permit compatibility of that reply e-mail with e-mail programs that do not support the present invention. Alternatively, the user may designate that the e-mail include (show) information about the discussion thread so that other users with e-mail programs which support the present invention would know that a received e-mail was a follow-up to a given discussion thread.

Figure 4:
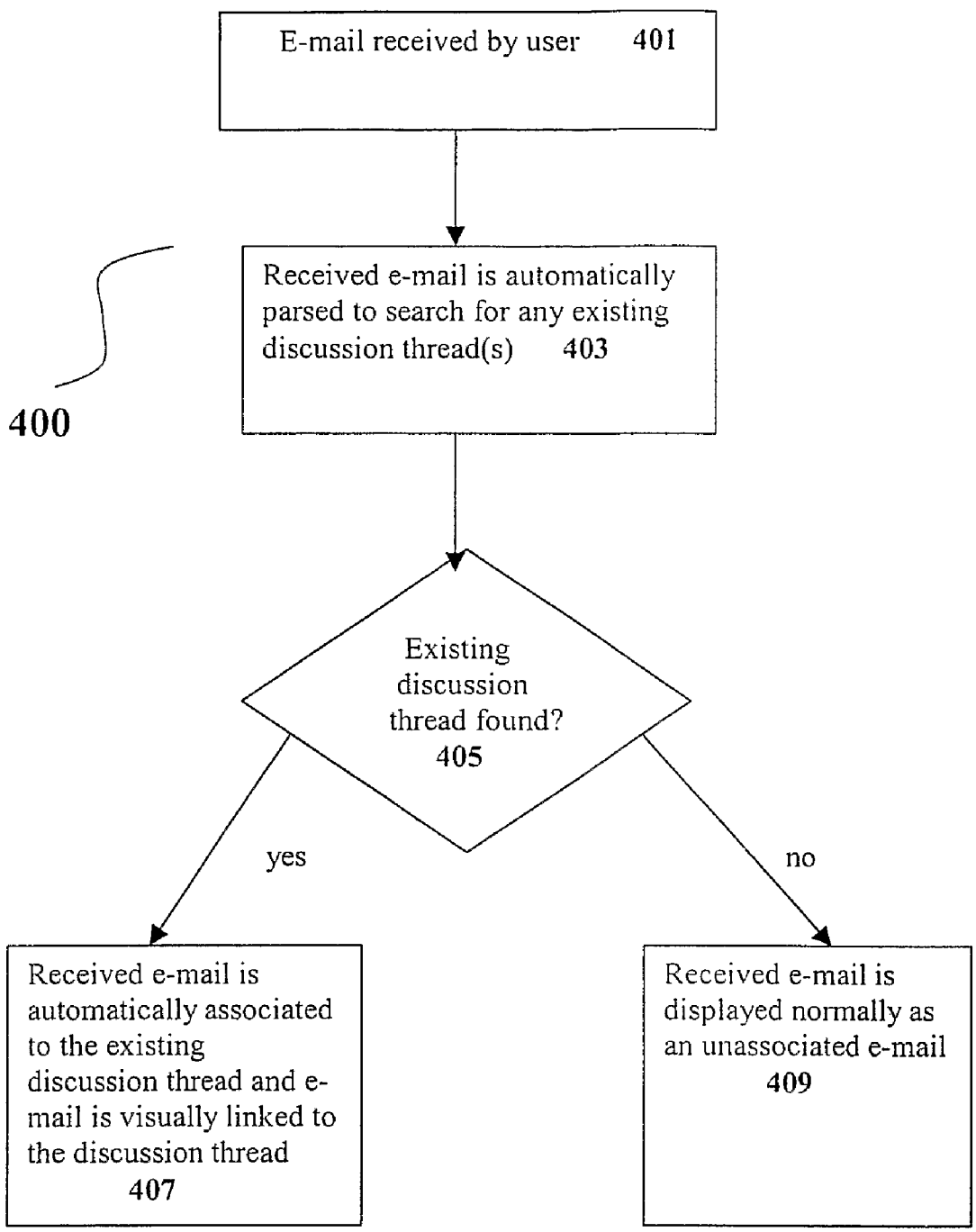
FIG. 4 is an exemplary flowchart of a method for processing a received e-mail according to an aspect of the present invention.

FIG. 4 is an exemplary flowchart 400 of a method for processing a received e-mail according to an aspect of the present invention. Preferably, the present invention provides an "auto-process" feature, i.e., the ability to automatically process a received e-mail to ascertain whether or not it is associated and/or has a discussion topic heading (e.g., already has an existing discussion thread) and accordingly, take appropriate action.

To illustrate, upon receipt of an e-mail by a user (step 401), the present invention automatically parses the received e-mail searching for any associated e-mail(s) and/or a discussion heading it may have (step 403). In decision box 405, it is determined whether any associated e-mail(s) and/or a discussion heading were found. If yes, the received e-mail is automatically associated with the existing discussion thread and a visual indication/display will preferably be provided to show that the e-mail is linked to the existing discussion thread (step 407).

If no, the received e-mail will be displayed normally as an unassociated e-mail (step 409).

Although the embodiment which incorporates the teachings of the present invention has been shown and described in detail herein, those skilled in the art can readily devise many other varied embodiments that still incorporate these teachings. Having described preferred embodiments for an e-mail organization system and method with the ability to organize and group e-mails from different sources under a common discussion thread (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

The invention claimed is:

1. A method for organizing e-mail messages comprising the steps of:
    providing a direct email-to-email association option in an email program;
    indicating at least one first e-mail message in a user mailbox;
    associating the at least one first e-mail message with a second e-mail message by enabling the association option, wherein said step of associating further comprises enabling an options list to appear with respect to the at least one first e-mail message, said options list including at least an associate option, a show associations option, and a hide associations option;
    selecting the associate option on the options list; and
    selecting the second e-mail message, wherein the second e-mail message is caused to be automatically associated to the at least one first e-mail message to form an associated group of e-mails; and
forming an associated group of e-mails in the user mailbox comprising at least two or more associated e-mail messages;
creating a reply email to at least one of the associated group of e-mails; and
    selecting at least one of the show associations option and the hide associations option for the reply e-mail to control whether the reply e-mail is to show the associated group of emails to a recipient.

2. The method of claim 1, wherein the reply e-mail shows its associated e-mail messages to the recipient when the show associations option is selected.

3. The method of claim 1, wherein the reply e-mail hides its associated group of e-mail messages from the recipient when the hide associations option is selected.

4. The method of claim 1, further comprising the step of providing a collapsability and expandability feature for the associated group.

5. The method of claim 4, further comprising the step of providing a first graphical indicator for indicating when the associated group is expanded and a second graphical indicator for indicating when the associated group is collapsed.

6. The method of claim 1, further comprising the step of providing e-mail operations for performing on the associated group of e-mail messages.

7. A method for organizing e-mail messages comprising the steps of:
    creating a user-defined discussion topic heading;
    displaying said discussion topic heading as a separate field in a mailbox entry in at least one of the user's mailboxes;
    associating at least one e-mail message to the user-defined discussion topic heading to form an associated e-mail-to-topic group;
    controlling whether an associated email message is to be displayed to a recipient of the at least one email message by selecting at least one of a show associations option and a hide associations option on a reply e-mail to be sent to a recipient; and
    showing the associated e-mail messages of the reply e-mail to the recipient if the show associations option is selected.

8. The method of claim 7, wherein the step of associating further comprises the steps of:
    enabling an options list to appear with respect to the user-defined discussion topic heading;
selecting an associate option on the options list; and
    indicating at least one e-mail message; wherein the at least one e-mail is caused to be automatically associated to the user-defined discussion topic heading to form the associated e-mail-to-topic group.

9. The method of claim 8, further comprising the steps of providing a show associations and a hide associations option on the options list; and selecting at least one of the show associations option and the hide associations option on a reply e-mail message to be sent to a recipient.

10. The method of claim 9, further comprising the step of hiding at least one of the discussion topic heading and associated e-mails of the reply e-mail message to the recipient if the hide associations option is selected.

11. The method of claim 7, further comprising the step of providing a collapsability and expandability feature for the associated e-mail-to-topic group.

12. An e-mail system comprising:
    an associate feature for providing at least one of a direct email-to-email or email-to-topic association option in an email program by enabling a user to directly link an email message to another email message or to a topic displayed as a field in a mailbox entry, thereby organizing e-mail messages to form at least one of an associated group of e-mail messages or an associated e-mail-to-topic group in at least one of the user's mailboxes, wherein the associated group of e-mail messages is formed by the user causing an options list to appear with respect to at least one first e-mail message, selecting an associate feature from said options list, and selecting a second e-mail message for causing the second e-mail message to be automatically associated to the at least one first e-mail message to form the associated group of e-mail messages, wherein the options list further comprises a show associations feature and a hide associations feature; and a reply email created for at least one of the associated group of e-mails, said reply e-mail being configured to show associations the associated group of email messages to a recipient.

13. The system of claim 12, wherein the options list is provided with respect to each e-mail message, said options list including said associate feature.

14. The system of claim 13, wherein the associated e-mail-to-topic group is formed by creating a user-defined discussion topic heading, causing the options list to appear with respect to at least one e-mail message, selecting the associate feature from said options list, and indicating the discussion topic heading, wherein the at least one e-mail message is caused to be automatically associated to the discussion topic to form the associated e-mail-to-topic group and said discussion topic heading appears as an additional field in said at least one e-mail message.

15. The system of claim 12, further comprising an auto-process feature for automatically parsing a received e-mail to search for an existing discussion thread, wherein if an existing discussion thread is found, the received e-mail is automatically associated to the discussion thread.

\* \* \* \* \*